No. 852,847. PATENTED MAY 7, 1907.
A. E. ROCKWELL.
STEERING GEAR FOR AUTOMOBILES.
APPLICATION FILED MAR. 23, 1906.
2 SHEETS—SHEET 1.
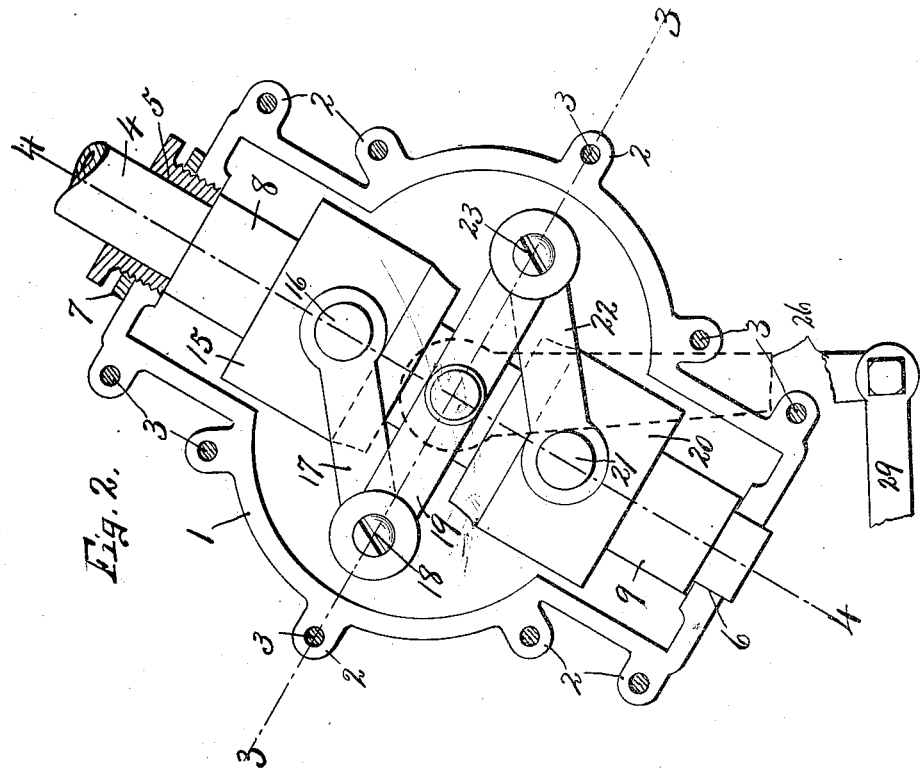
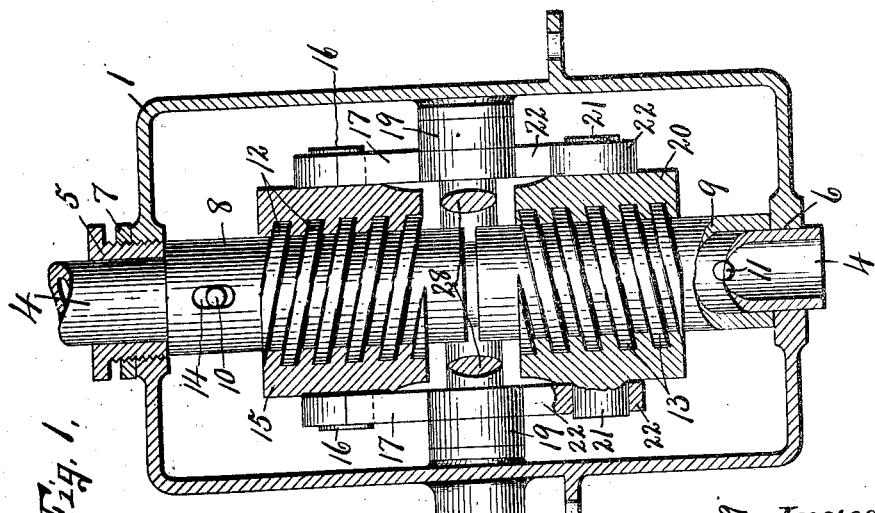

No. 852,847. PATENTED MAY 7, 1907.
A. E. ROCKWELL.
STEERING GEAR FOR AUTOMOBILES.
APPLICATION FILED MAR. 23, 1906.

2 SHEETS—SHEET 2.

Witnesses:
A. C. Thomas
H. E. Chase

Inventor
A. E. Rockwell
By
Howard P. Denison
Atty.

UNITED STATES PATENT OFFICE.

ARTHUR E. ROCKWELL, OF OSWEGO, NEW YORK.

STEERING-GEAR FOR AUTOMOBILES.

No. 852,847.　　　　Specification of Letters Patent.　　　　Patented May 7, 1907.

Application filed March 23, 1906. Serial No. 307,616.

*To all whom it may concern:*

Be it known that I, ARTHUR E. ROCKWELL, of Oswego, in the county of Oswego, in the State of New York, have invented new and useful Improvements in Steering-Gear for Automobiles, of which the following, taken in connection with the accompanying drawings, is a full, clear, and exact description.

This invention relates to certain improvements in steering gear for automobiles, in which the essential object is to simplify the mechanism which operates the crank-arm connected to the steering wheels of the vehicle by making such mechanism with a minimum number of parts and associating such parts in such manner that the steering wheels may be turned from one extreme to the other with a minimum movement of the steering post, and positively lock in their adjusted position without unduly straining the parts of the steering mechanism or causing excessive vibration of the steering post while the steering-wheels are passing over obstructions.

A further object is to enable the wearing parts of the steering mechanism to be quickly and easily adjusted to take up any wear, and thereby prevent loss motion of the steering post or steering wheels.

In other words, the broad object of my present invention is to produce a quick and responsive action of the steering wheels with a minimum movement of the steering post and with as little loss motion as possible.

Figure 3:
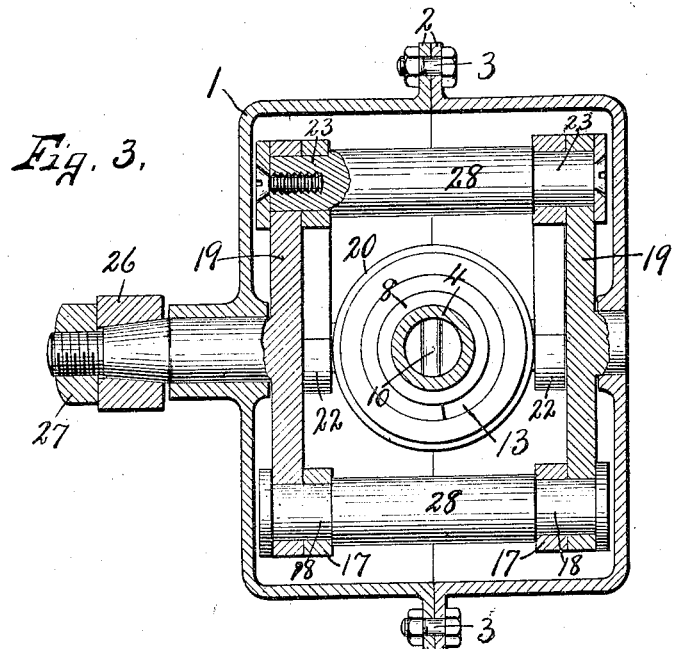
Figure 4:
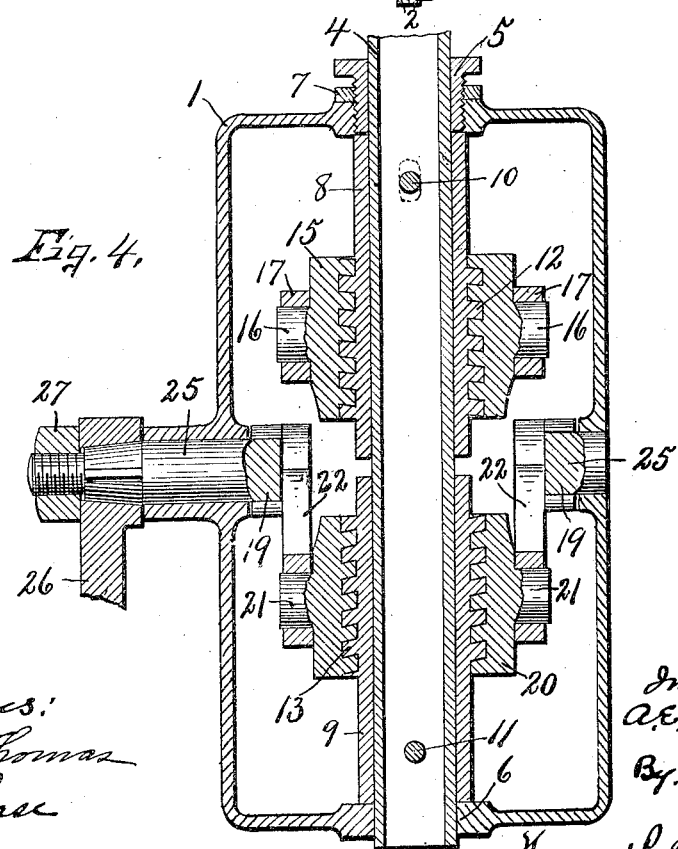

In the drawings—Figures 1 and 2 are elevations, taken at right angles to each other, of my improved steering gear showing the case and part of the steering mechanism in section, in Fig. 1, and also showing in Fig. 2, one-half the case, and a section of the adjusting-means for taking up the wear, Figs. 3 and 4 are sectional views taken respectively on lines —3— and —4—4, Fig. 2.

In carrying out the objects stated, I provide a suitable gear-case —1— which is divided through its longitudinal center forming opposite half sections, each having a series of registered apertured ears —2— for receiving clamping bolts —3— whereby the sections may be clamped together to inclose the essential parts of the steering gear.

A suitable tubular steering-post —4— is journaled in bearings —5— and —6— on the gear-case —1—, the upper bearing —5— consisting in this instance, of a threaded hollow bushing which is screwed into the upper end of the gear-case and is held in its adjusted position by a lock-nut —7—, while the lower end of the post is journaled in the lower end of the case —1— so that the axis of the steering post is substantially co-incident with the plane of division or meeting faces of the half sections of the gear-case.

The portion of the post —4— within the gear-case —1— is provided with encircling sleeves —8— and —9— arranged end to end and each separately keyed to the steering-post by any suitable means, as pins —10— and —11—, whereby the sleeves are caused to rotate with the steering post.

One of the sleeves, as —8— is provided with a left-hand screw-thread —12— of comparatively steep pitch, while the other sleeve —9— is formed with a right-hand thread —13— of the same steep pitch as the thread —12—. This sleeve —8— abuts against the inner end of the threaded bushing —5— and is formed with an elongated slot —14— receiving the key-pin —10— and of sufficient length to allow the sleeve —8— to be adjusted endwise by the threaded bushing —5— to take up any wear upon the threads and their co-acting nuts presently described. The other sleeve —9— has its lower end rigidly keyed to the lower end of the steering post —4— by the pin —11— and abuts against the inner face of the lower end of the gear-case —1—.

A nut or internally threaded collar —15— is engaged with the threads —12— and is provided with diametrically opposite studs or pins —16— upon which are journaled one end of a pair of links —17—, the other ends of said links being pivotally attached at —18— to a pair of transversely extending rock-arms —19—. Engaged with the other thread —13— is a similar nut or internally threaded collar —20— which is also provided with diametrically opposite studs or pins —21—, and upon these pins or studs —21— are journaled one end of a pair of links —22— similar to the link —17—, and having their other ends pivoted at —23— to the opposite end of the rock-arms —19—. These rock-arms —19— are located at opposite sides of the steering post —4—, and are each provided with a central fulcrum-pin or shaft —25—, said fulcrum pins or shafts extending in opposite directions from their respective rock-arms —19—, and are journaled in opposite sides of the gear-case —1—.

One of the fulcrum studs or shafts —25— is longer than the other and extends entirely through and some distance beyond the adjacent side of the gear-case, its outer end being preferably tapered and angular in cross section for receiving one end of the crank-arm —26—, which is held firmly in place by a suitable nut —27— engaging the threaded end of the shaft or stud to which the crank-arm —26— is secured.

The rock-arms —19— are spaced apart a sufficient distance to receive between them the threaded collars —15— and —20—, and extend equal distances at opposite sides of the axes of their respective shafts —25— while the links —22— and —17— are pivoted to said rock-arms at equal distances from said axes. Corresponding ends of the rock-arms —19— are tied together and held a fixed distance apart by suitable stay-bolts or tie-rods —28— having reduced ends upon which the adjacent ends of the rock-arms —19— and links —17— and —22— are pivotally mounted. It is now obvious that the rock-arms 19— and their connecting rods —28— constitute a rocking frame to which the threaded collars 15— and —20— are linked, and this rocking frame, to which the oppositely projecting shafts or studs —25— are rigidly secured, is adapted to transmit similar rocking movement to the crank-arm —26—, which latter may be connected in any desired manner to the steering wheels of the vehicle, said crank-arm having its lower end pivotally connected to a link —29— for this purpose.

The steering post —4— may be rotated by any suitable hand-piece, not necessary to herein illustrate or describe, and it is evident that during such rotation the threaded collars 15— and —20— are moved axially in opposite directions, either toward or away from each other by means of the right and left-hand threads 13— and 12— on the sleeves —9— and —8—, and owing to the fact that these threaded collars are connected by the links —17— and —22— to the rock-arms 19— at opposite sides of its fulcrum, it is evident that said rock-arms will be oscillated in one direction or the other, according to the movement of the collars 15— and —20—, and that similar rocking movement will be transmitted to the crank-arm —26—.

There will, of course, always be more or less wear upon the threaded parts of the steering-gear as well as upon the pivotal connections of the rock-arms —19 and links —17— and —22—, and in order to provide means for taking up such wear and preventing loss-motion, the adjacent ends of the sleeves —8— and —9— are spaced some distance apart to permit the endwise adjustment of said sleeves by the adjusting bushing —5—, which, when screwed against the end face of the sleeve —8—, forces the threads of the latter into closer engagement with the threads of the nut 15—, and if there is any play in the nut —20—, the inward movement of the nut —15—, by the adjuster —5— will rock the arms —19— sufficient to draw the nut —20— inwardly to effect a closer eagagement of its threads with those of the sleeve —9—. This adjustment, is, of course, only slight, and even in extreme cases, would not tilt the rocking-arms 19— to any great extent from their normal position.

What I claim:

1. A steering gear for automobiles comprising a steering post, oppositely threaded sleeves secured to the post, oppositely threaded nuts each engaging its respective sleeve, a rock-shaft having a crank-arm thereon, and means for transmitting motion from said nuts to the rock-shaft.

2. A steering gear for automobiles comprising two co-axial oppositely threaded members arranged end to end, and means for simultaneously rotating them a pair of co-axial nuts arranged end to end, each engaging one of the threaded members, whereby the nuts are moved simultaneously in opposite directions, a crank-shaft and links connecting the nuts to said crank-shaft.

3. A steering gear for automobiles comprising two threaded members, one having a right-hand thread and the other a left-hand thread, said threaded members revolving on the same axis and arranged end to end, means for rotating said members simultaneously, oppositely threaded nuts each engaging one of said members, a rock-arm fulcrumed intermediate its ends and having each end flexibly connected to one of the nuts, and a crank-arm secured to the rock-arm.

4. A steering gear for automobiles comprising two oppositely threaded members arranged end to end on the same axis, means for simultaneously rotating said members, threaded collars each engaging one of the threaded members, a crank-arm and means for transmitting motion from each of said collars to the crank-arm.

5. A steering gear for automobiles comprising two oppositely threaded members arranged end to end upon the same axis, one of them being adjustable endwise, means for effecting such adjustment, additional means for simultaneously rotating said members, threaded collars each fitted upon one of the threaded members, and fixed against rotation, a crank-shaft, and means for transmitting motion from each of the collars to said crank-shaft.

6. A steering-gear for automobiles comprising a steering post and co-axial oppositely threaded screws mounted end to end thereon, co-axial nuts arranged end to end engaging their respective screws, a crank arm and links connecting said nuts to the crank arm.

7. A steering gear for automobiles comprising a steering post, oppositely threaded members keyed to the post, one of them being adjustable endwise, means for effecting such adjustment, a crank-shaft, a rock-arm secured to the crank-shaft and links pivotally attached to the rock-arm at opposite sides of its axis, and each connecting one end of said rock-arm to one of the collars, and oppositely threaded collars each engaging one of said threaded members, and held against rotation by said links.

In witness whereof I have hereunto set my hand this 24th day of February 1906.

ARTHUR E. ROCKWELL.

Witnesses:
   H. E. CHASE,
   HOWARD P. DENISON.